(12) United States Patent
Parnell

(10) Patent No.: US 7,474,072 B1
(45) Date of Patent: Jan. 6, 2009

(54) CASE PACKING ROBOT

(75) Inventor: Geoffrey Parnell, Mosely, VA (US)

(73) Assignee: Bakery Holdings, LLC, Richmond, VA (US)

( * ) Notice: Subject to any disclaimer, the term of this patent is extended or adjusted under 35 U.S.C. 154(b) by 214 days.

(21) Appl. No.: 11/589,009

(22) Filed: Oct. 27, 2006

(51) Int. Cl.
B25J 9/18 (2006.01)

(52) U.S. Cl. .............................. 318/568.11; 318/568.12; 318/568.21

(58) Field of Classification Search ............ 318/568.11, 318/568.12, 568.21; 901/27, 30; 702/150
See application file for complete search history.

(56) References Cited

U.S. PATENT DOCUMENTS 6,179,531 B1 * 1/2001 Jaw .............................. 409/83

2003/0123970 A1 * 7/2003 Grams et al. ................. 414/807

* cited by examiner

Primary Examiner—Karen Masih

(57) ABSTRACT

A case packing robot comprising a two dimensional articulated robot suspended from the top of a Cartesian gantry-type frame enclosure. All drive motors are fixed to the Cartesian gantry-type enclosure and all packing operations take place within the confines of the gantry frame structure that defines the operating envelope. Such a "hybrid" robot uses an open framework and all slanted or slantable surfaces that are easily sanitized thus providing all of the sanitary advantages of the most desirable articulating robots while supplying many of the operational and maintenance advantages of a Cartesian gantry-type robot, especially the ability to reach down into a packing container.

9 Claims, 9 Drawing Sheets

CASE PACKING ROBOT

FIELD OF THE INVENTION

The present invention relates to case packing robots and more particularly to a suspended articulating robot designed specifically for this purpose.

BACKGROUND OF THE INVENTION

So-called Cartesian style gantry robots have long been used in top loading applications. The design of such devices permits them to pick product and to reach into deep cases for the packing of product. While such robots have proven highly satisfactory for many case packing applications, their use in highly sanitary environments such as in the packing of meats and dairy products has proven somewhat undesirable due to their many horizontal flat surfaces and the presence of such structures as timing belts which make their sanitation difficult.

Some articulated robots on the other hand while proving highly desirable for sanitary applications have, because of their structure, not been suited to, for example case packing, due do the relatively large footprint needed to accommodate such a robot in a case packing situation and their limited ability to reach into a deep packing case or other receptacle. Many articulated robots also include elements or parts that are subject to contamination making them equally inapplicable to sanitary applications. Such articulated robots often include "sealed", covered or closed portions that can be penetrated my contaminating liquids or the like, making them inappropriate for use in sanitary applications and environments. Accordingly, articulated robots have been designed and utilized primarily in welding and painting applications where multiple shallow reaches are necessary and not specifically for case packing operations where deep reaching into a case, crate or box, for example, is needed.

Additionally, while Cartesian gantry robots are generally PLC based in their controls and thus readily serviced or programmed by more generally trained operators, articulated robots largely comprise a series of "black boxes" whose controls and mechanisms can only be manipulated and serviced by highly trained personnel. This often results in excess downtime when a failure occurs and a trained technician must be called in to service the articulated robot. As a further shortcoming, articulated robots because of their design (the location of drive motors on the arms) that provide their ability to reach are generally limited in their product handling capabilities by either lack of payload capacity or lack of speed. Many case packing applications require the ability to handle a relatively high payload and speed combination.

Accordingly, there exists a continuing need for a device that while providing the sanitary cleaning capabilities of an articulated robot simultaneously provides the relatively small footprint, load handling and case packing capabilities of a gantry robot.

OBJECT OF THE INVENTION

It is therefore an object of the present invention to provide a case loading robot that possesses the many advantages of an articulated robot while using the small footprint and ease of maintenance common to Cartesian gantry robots and providing the deep reaching abilities of Cartesian gantry-type robots.

SUMMARY OF THE INVENTION

According to the present invention there is provided a case packing robot comprising a two dimensional or two degree of freedom articulated robot suspended from the top of a Cartesian gantry-type frame enclosure. All drive motors are fixed (i.e. not in motion) to the Cartesian gantry-type enclosure and all packing operations take place within the confines of the gantry frame structure that defines the operating envelope. Such a "hybrid" robot uses an open framework and all slanted or slantable surfaces that are easily sanitized thus providing all of the sanitary advantages of the most desirable articulating robots while supplying many of the operational and maintenance advantages of a Cartesian gantry-type robot, especially the ability to reach down into a packing container.

DETAILED DESCRIPTION

Figure 1:
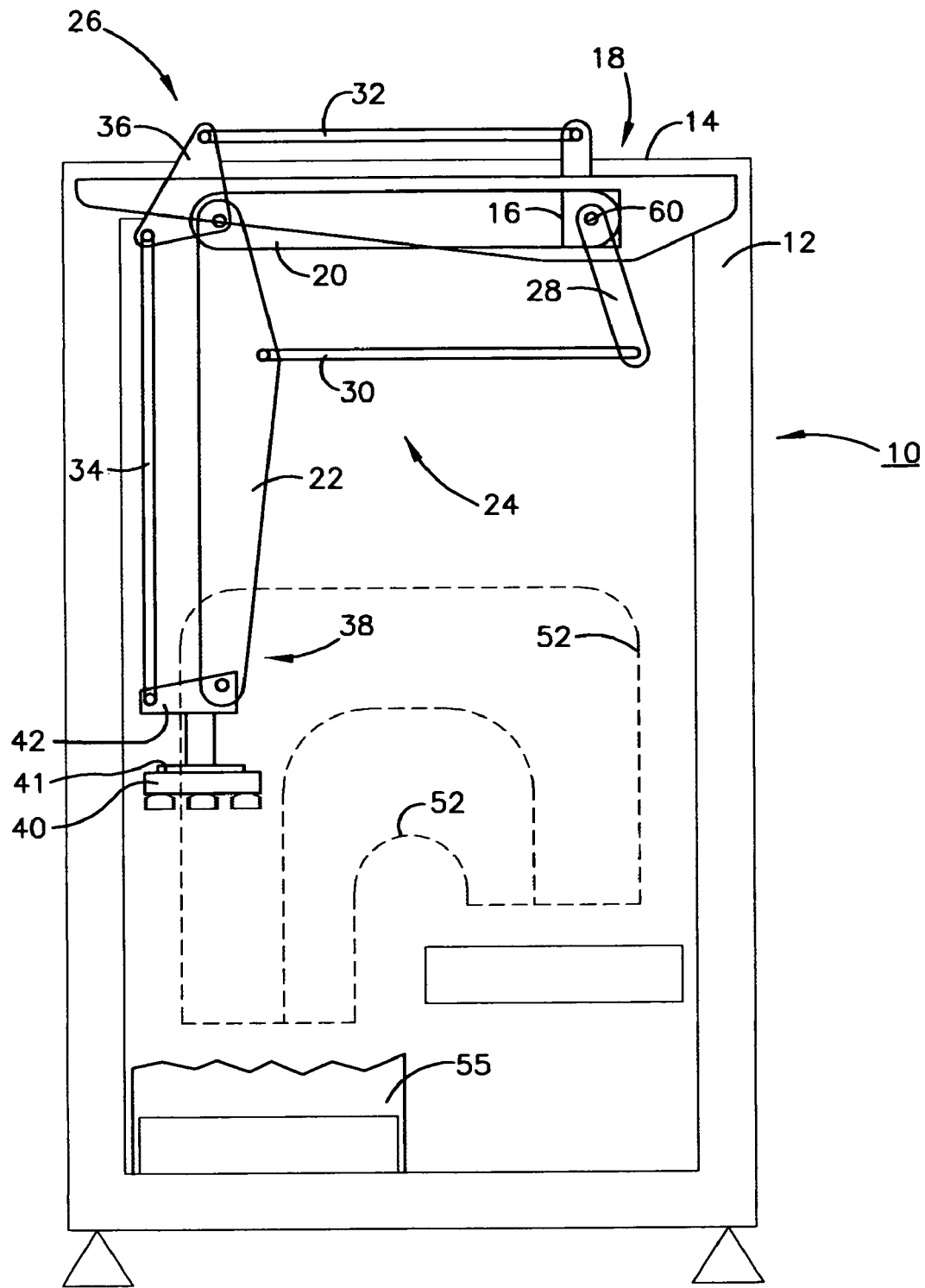
FIGS. 1-7 are simplified conventional views of the kinematic profile of the robot of the present invention in its operating positions.

Referring now to the accompanying drawings, the case loading articulated robot of the present invention 10 comprises a frame 12 that forms an integral part of robot 10 and defines the work space of robot 10. It should be specifically noted that all surfaces of frame 12 including top surface 14 are all slanted, i.e. tilted downward, to eliminate flat horizontal surfaces that might inhibit sanitizing. Additionally the various arms described hereinafter are of an open structure with no closed or sealed areas that could become contaminated to allow for ease of sanitation. As shown in the various Figures, servo motors 16 and 18 which drive generally horizontal first arm 20 proximate top 23 and generally vertical second arms 22 proximate sides 25 are fixed to frame 12 thus avoiding the need to provide arms 20 and 22 with adequate strength as to support arm drive servo motors, as is the case in conventional articulated robots wherein such drive motors are mounted on the arms of the articulated robot. This fixed location of servo motors 16 and 18 allows for an increase in the weight handling capabilities of generally horizontal first arm 20 and generally vertical second arm 22 and hence robot 10. An end effector 40 of any suitable design is attached to the remote end 38 of second arm 22. According to a preferred embodiment of the present invention, second arm 22 is equipped with a fixture that allows for the rapid removal and change out of end effector 40.

Figure 9:
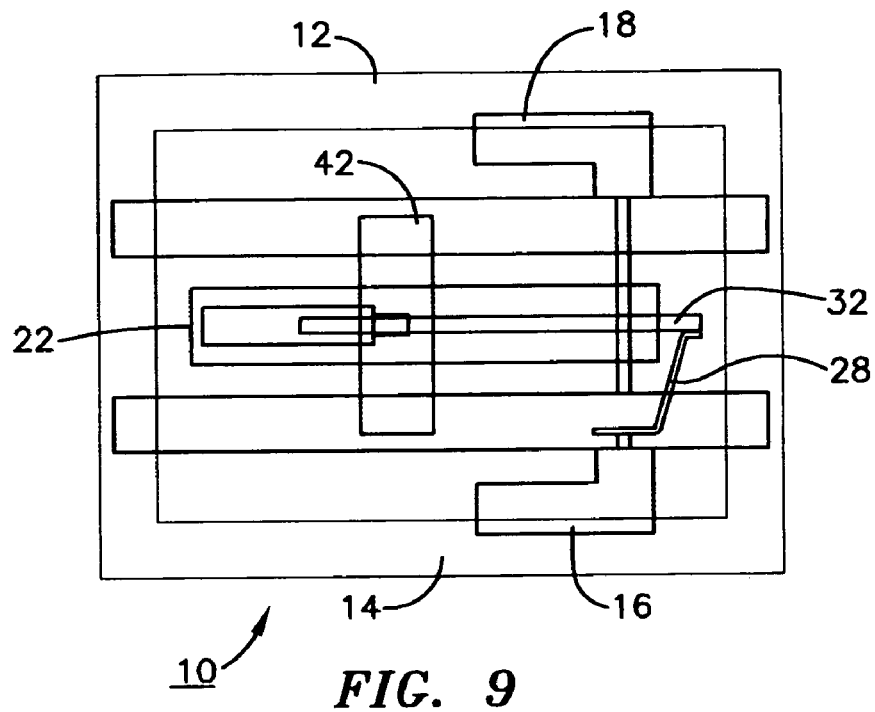
FIG. 9 is a top plan view of the robot of FIGS. 1-7.

Each of first and second arms 20 and 22 are equipped with a tie rod assembly 24 and 26 connected to servo motors 16 and 18 and first and second arms 20 and 22 respectively. Tie rod assemblies 24 and 26 each comprise first arm first and first arm second and second arm first and second arm second tie rods 28 and 30 and 32 and 34 respectively. First and second arm first tie rods 30 and 34 impart the actual driving energy to arms 20 and 22 while first and second arm second tie rods 28 and 32, while assisting with the transmission of drive energy from servos 16 and 18 to arms 20 and 22 also serve to maintain the parallel arrangement of first tie rods 30 and 34 with arms 22 and 20 respectively so that end effector 40 stays parallel to any load or case 55 to be packed. It should be noted that triangular connector 36 serves to transmit driving energy provided by servo 16 to first and second arm tie rods 32 and 34 to second arm 22. End effector 40 attached to remote end 38 of second arm 22 via connector plate 42 is driven by an appropriate servo 41 located on remote end 38. As best seen in FIG. 9, first arm first tie rod 28 is angularly disposed with respect to servo 16 and tie rod 30 so as to permit the transfer of energy form servo 16 to first arm 20 without interfering with the operation of servo 18 and second arm 22.

It will be clear to the skilled artisan that freely rotating bearings are provided at each of the points of juncture between the various arms, tie rods and connectors shown in the attached drawings with the exception of joints such as that 60 where a first tie rod is connected directly or indirectly to servo 16 or 18. Similarly, it will be readily apparent to the skilled artisan that servo 16 rotates first arm 20 up and down while servo 18 rotates second arm 22 horizontally through the action of the various tie rods and connectors described above. In the case of the connections between first arm first tie rod 28 and servo 16 and second arm tie rod 32 and servo 18 suitable drive connectors are used to impart driving energy from servos 16 and 18 to the appropriate arms.

Figure 6:
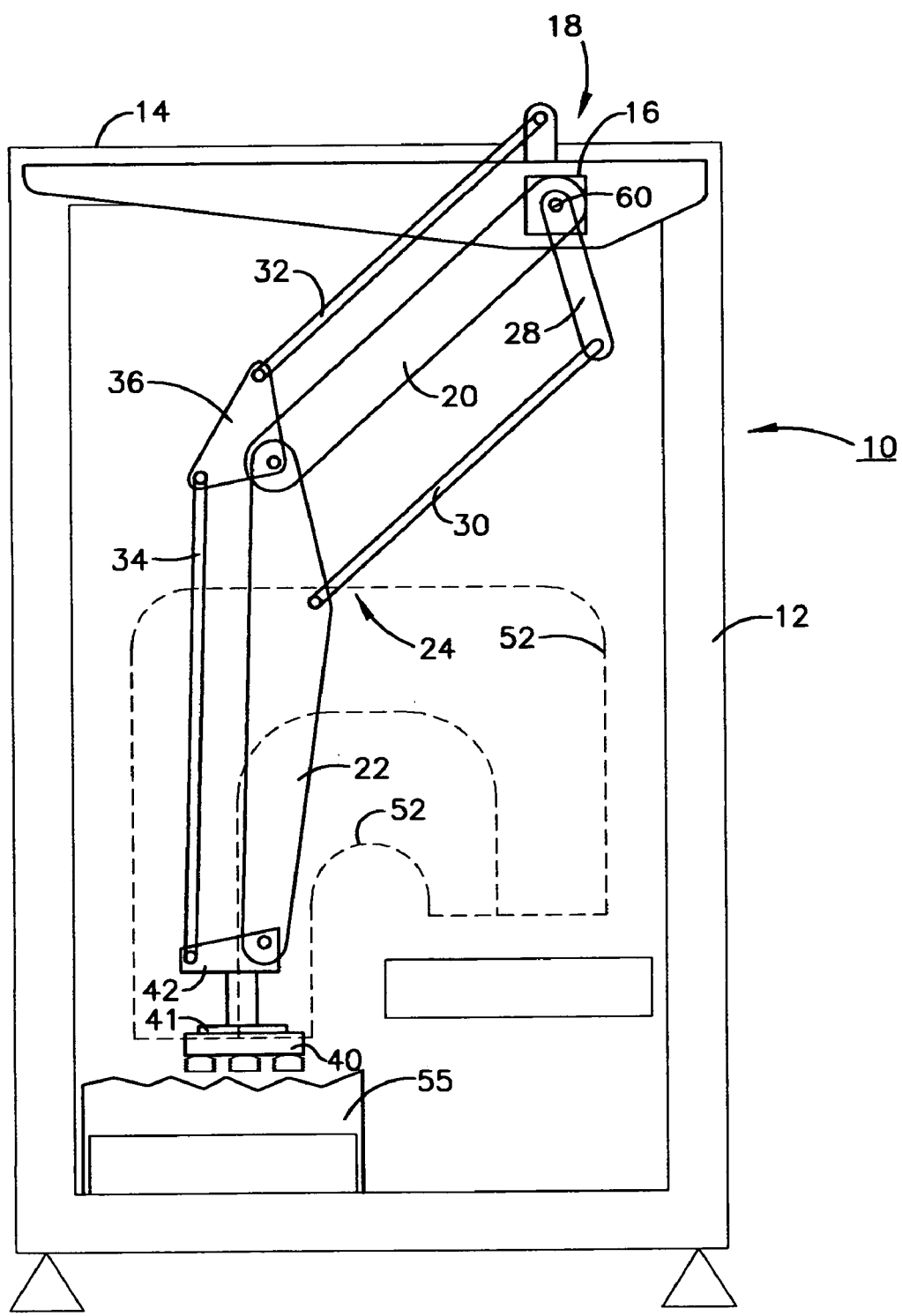
Figure 7:
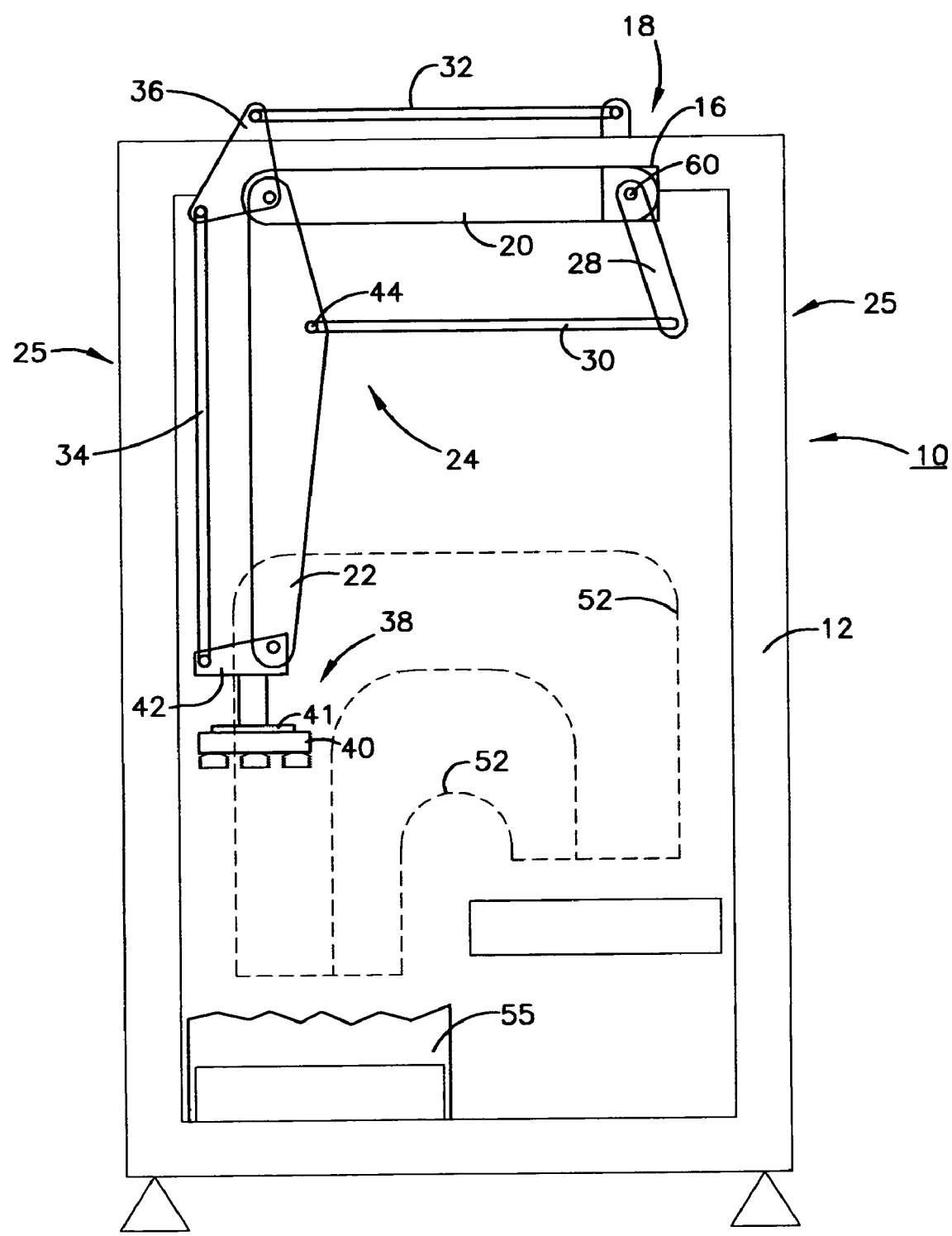
Figure 8:
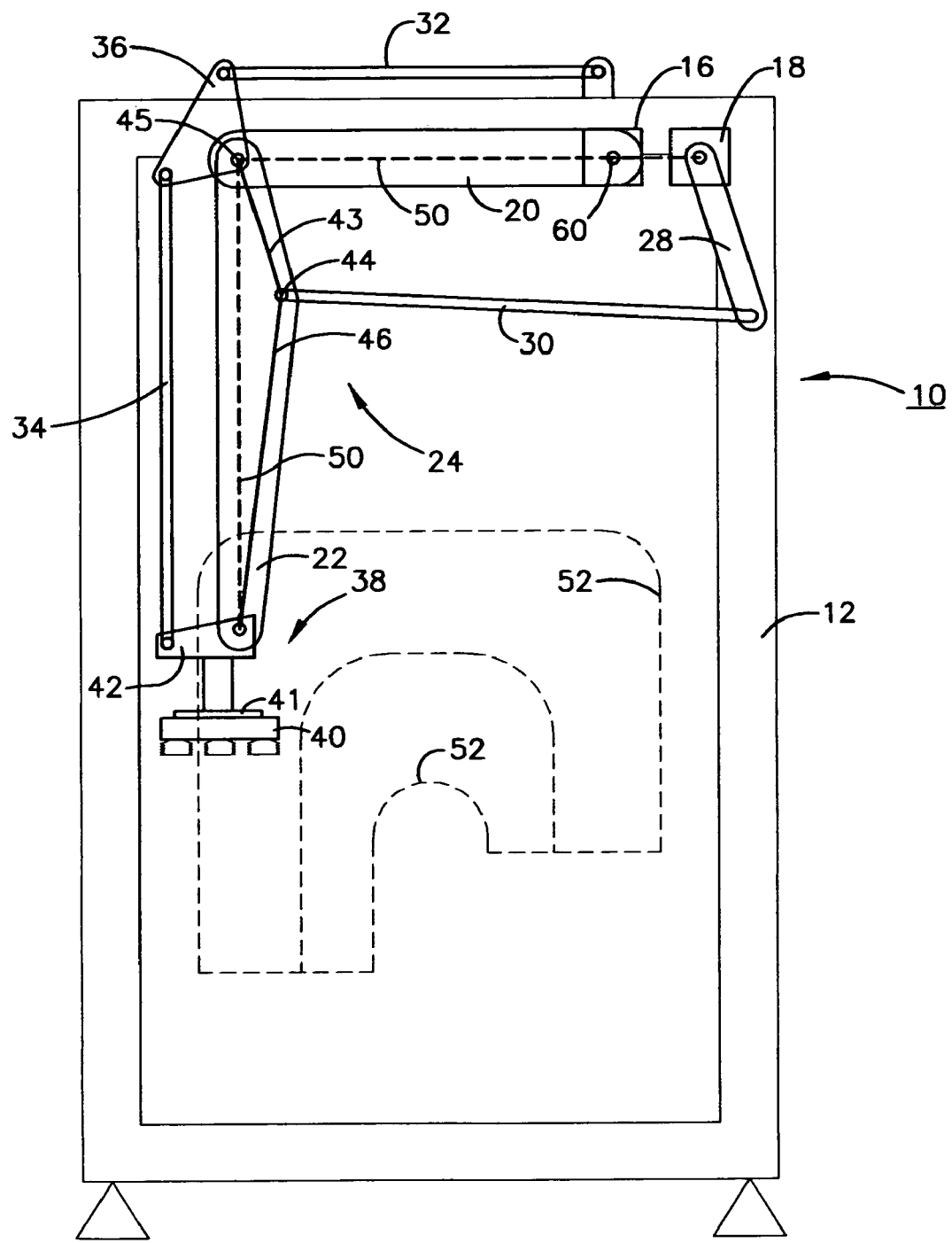
FIG. 8 shows the actual position of the various elements that are simplified to the traditional kinematic profiles presented in FIGS. 1-7.
Figure 10:
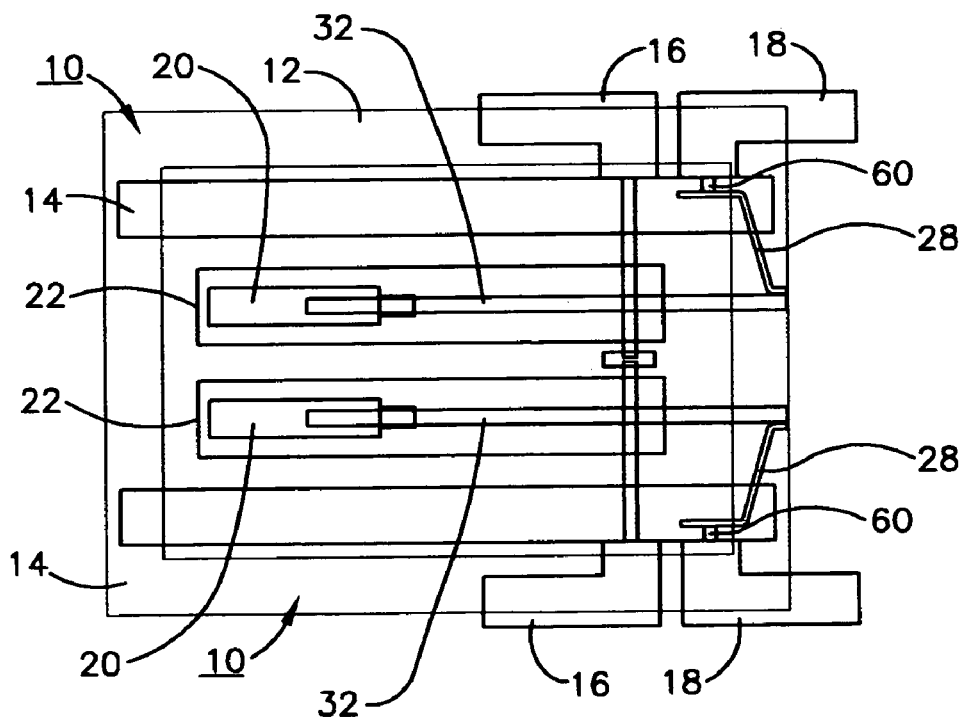
FIG. 10 is a top plan view of an alternative embodiment of the robot of the present invention.

While FIGS. 1-7 depict one embodiment and the traditional simplified kinematic profiles of robot 10, FIG. 8 depicts an alternative preferred embodiment of robot 10 of the present invention. As shown in FIG. 8, second arm 22 is offset and includes an additional freely rotating joint 44 to define a triangular shape 46 between the location where arm 22 would be located were the traditional in line kinematic relationship shown in FIGS. 1-7 utilized, and in its offset position as depicted in FIG. 8. Such an alternative preferred configuration provides several advantages. For example, the overall footprint of robot 10 can be narrowed by the location of both servos 16 and 18 on the same side and in staggered location on frame 12 as shown in FIGS. 8 and 10, while not interfering in any way with the effective operation of robot 10. Additionally, offsetting of arm 22 provides space for the passage of utility lines such as vacuum, hydraulic and electrical connectors or transmitters necessary for the operation of end effector 40 (indicated by line 50 in FIG. 8).

Such a configuration with both servos on the same side of frame 12 is also shown in FIG. 10 wherein two robots 10 are located side-by-side and operated by two pairs of servos 16 and 18 each driving one of the two robots 10. In the configuration depicted in FIG. 10 the load remains centered within frame 12 without concern for centering the location of the servos 16 and 18, thereby providing significantly more design flexibility. The term offset as used in the appended claims is intended to define the alternative second arm configuration depicted in FIG. 8.

It should be noted that the configuration depicted in FIG. 8 has additional advantages. A traditional arm would have a traditional linkage arrangement where servo 16 horizontal arm 20 and servo 18 linkage are parallel and of the same length when measured from pivot point to pivot point. Also, the traditional arm would have the pivot points of the servo 18 vertical arm and the pivot points of vertical arm 22 (where the end effector is mounted) of equal length and parallel. The final pivot point of the end effector arm would be in-line with the other two pivot points of that arm. Furthermore, the pivot point of the two motors are typically axially aligned. There are standard equations which describe the motion of this traditional linkage and these equations are not applicable to the present invention. The present invention differs in that the long arm 22 does not have its three pivot points in-line with each other. Because the force is delivered at the center and top end pivot points 44 and 45, an in-line arrangement would be weak since the arm would be a straight line (like holding both ends of a popsicle stick and pushing on the middle flat side). The present invention has the three points arranged in a triangular fashion which allows more force to be transmitted from without fear of arm 22 buckling (like gluing one long and two short popsicle sticks together in an elongated triangle and then holding both ends of the long stick and pushing where the other two sticks are connected together). Additionally, because arm 222 is constructed of wrapped sheet metal and because the force from link to on arm 22 is not in the center of the arm, the center of the arm can be used to route large diameter hoses such as vacuum hoses, cables and other utilities to the end effector. The inside of both arms are free of obstacles which allows them to be used as a conduit or cableway, as mentioned above. Furthermore, a custom reverse kinematics solution for the present invention allows for the motion to be described regardless of the relative length or location of the pivot points with each other. In other words, tie rod 30 can be longer than tie rod 32 as shown in FIG. 8. Also, the two servo motors to not need to be axially aligned. Allowing an axial offset of the servo motors is important if the present invention were configured with both motors on one side of the arm as shown in FIGS. 8 and 10. It would, for example, be advantageous to have both servo motors 16 and 18 on one side of the arm if two separate arms needed to be right next to each other as depicted in FIG. 10 in which case they could be mirror imaged and the four servo motors would not interfere with each other.

Figure 2:
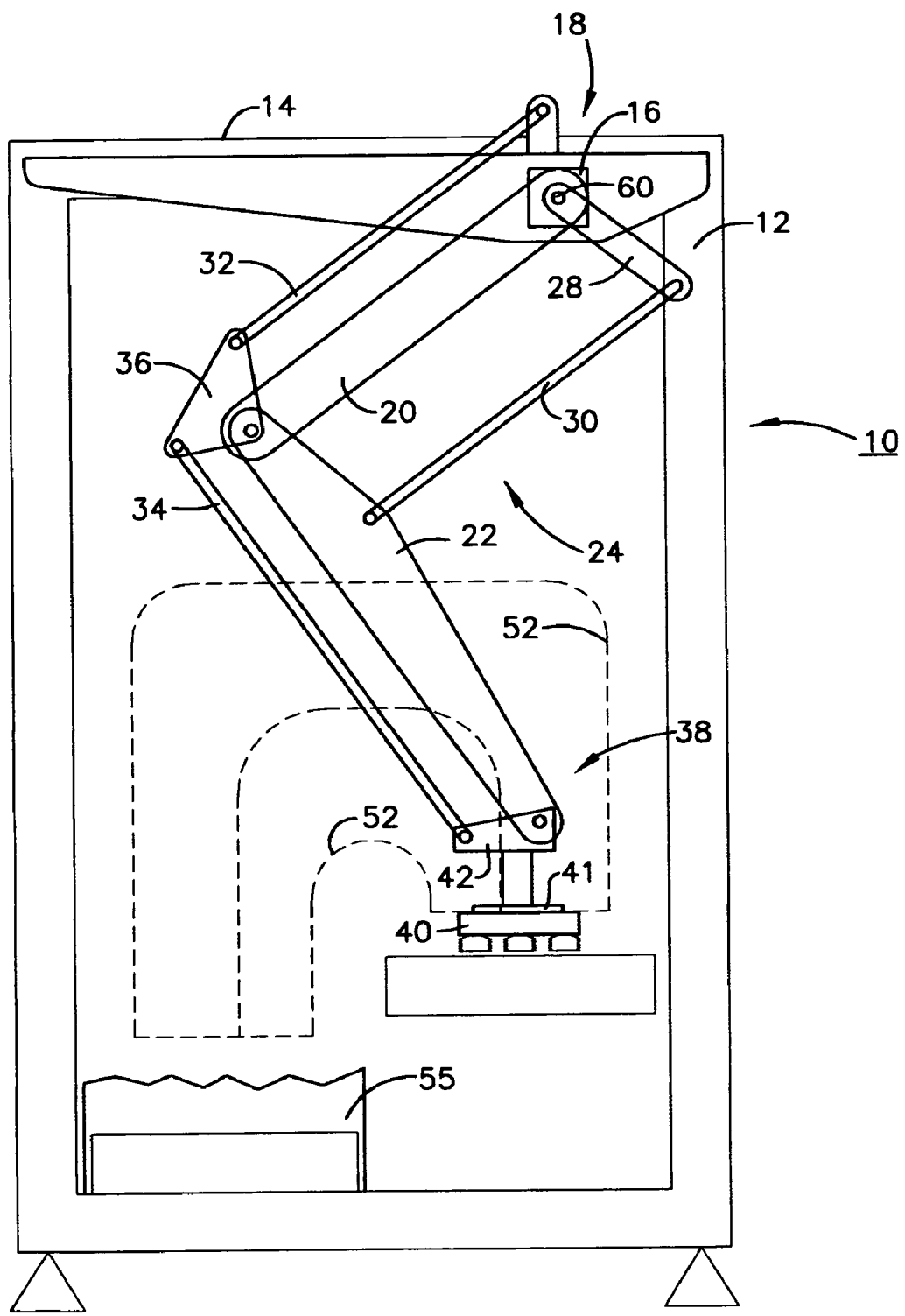
Figure 3:
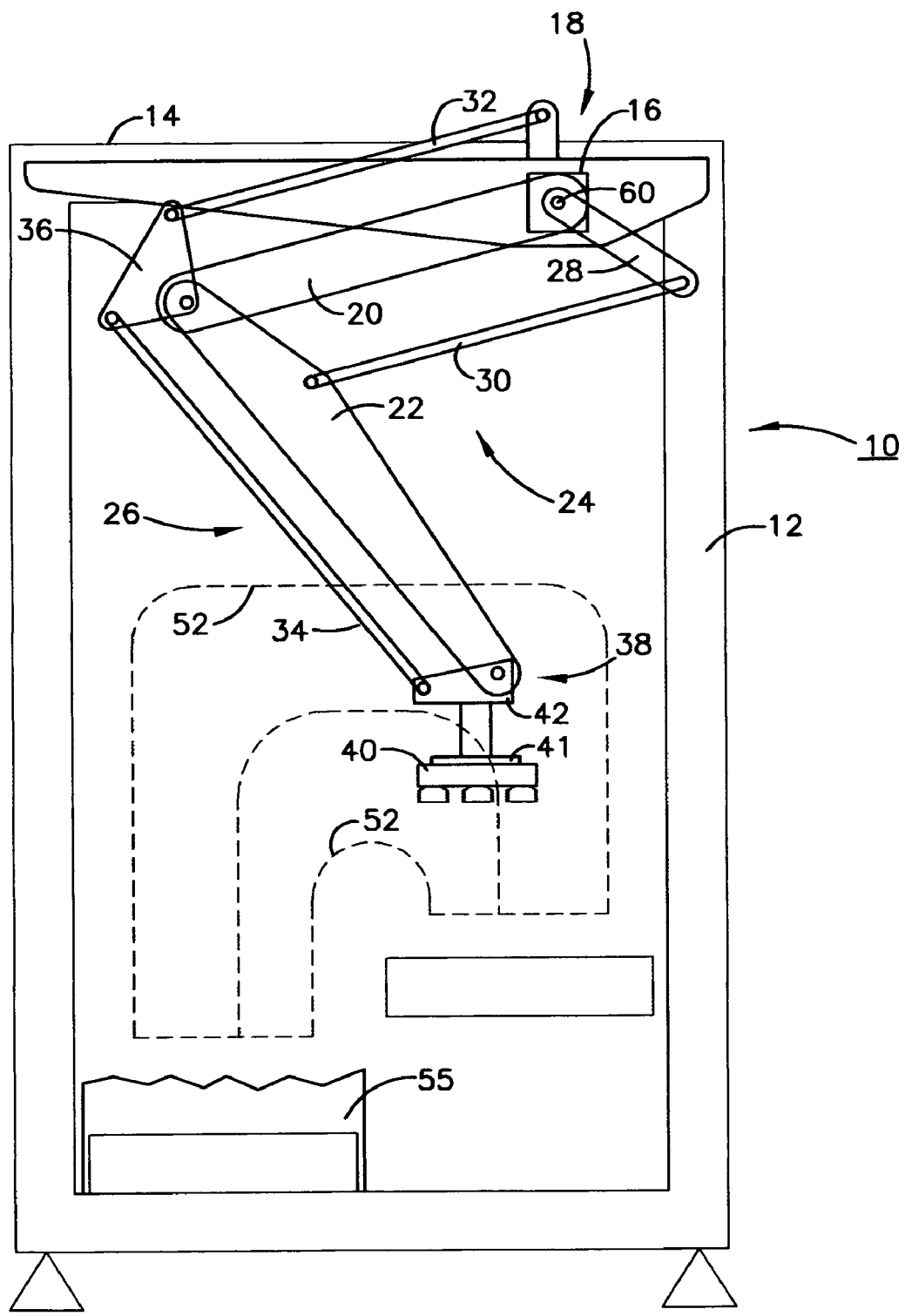
Figure 4:
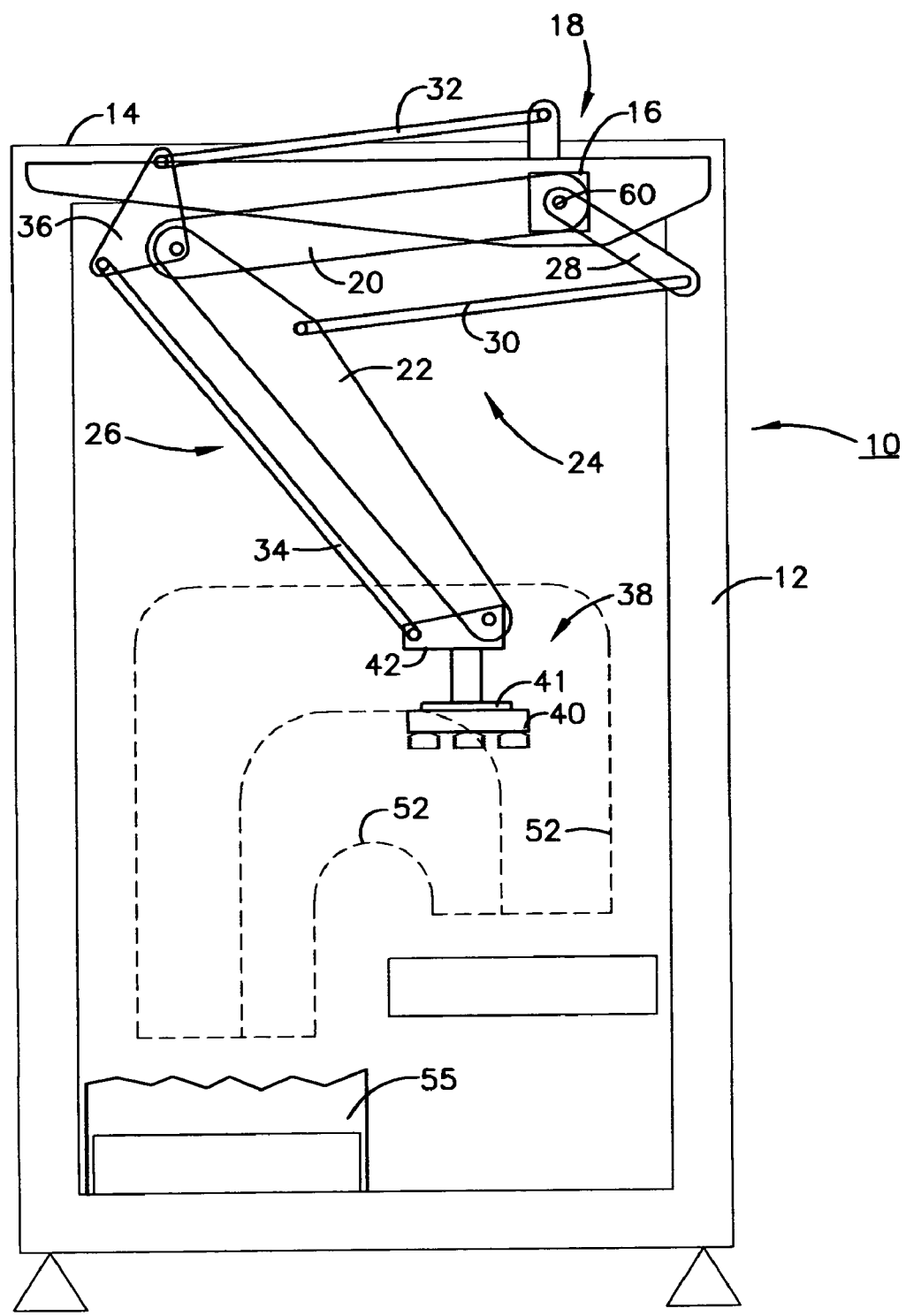
Figure 5:
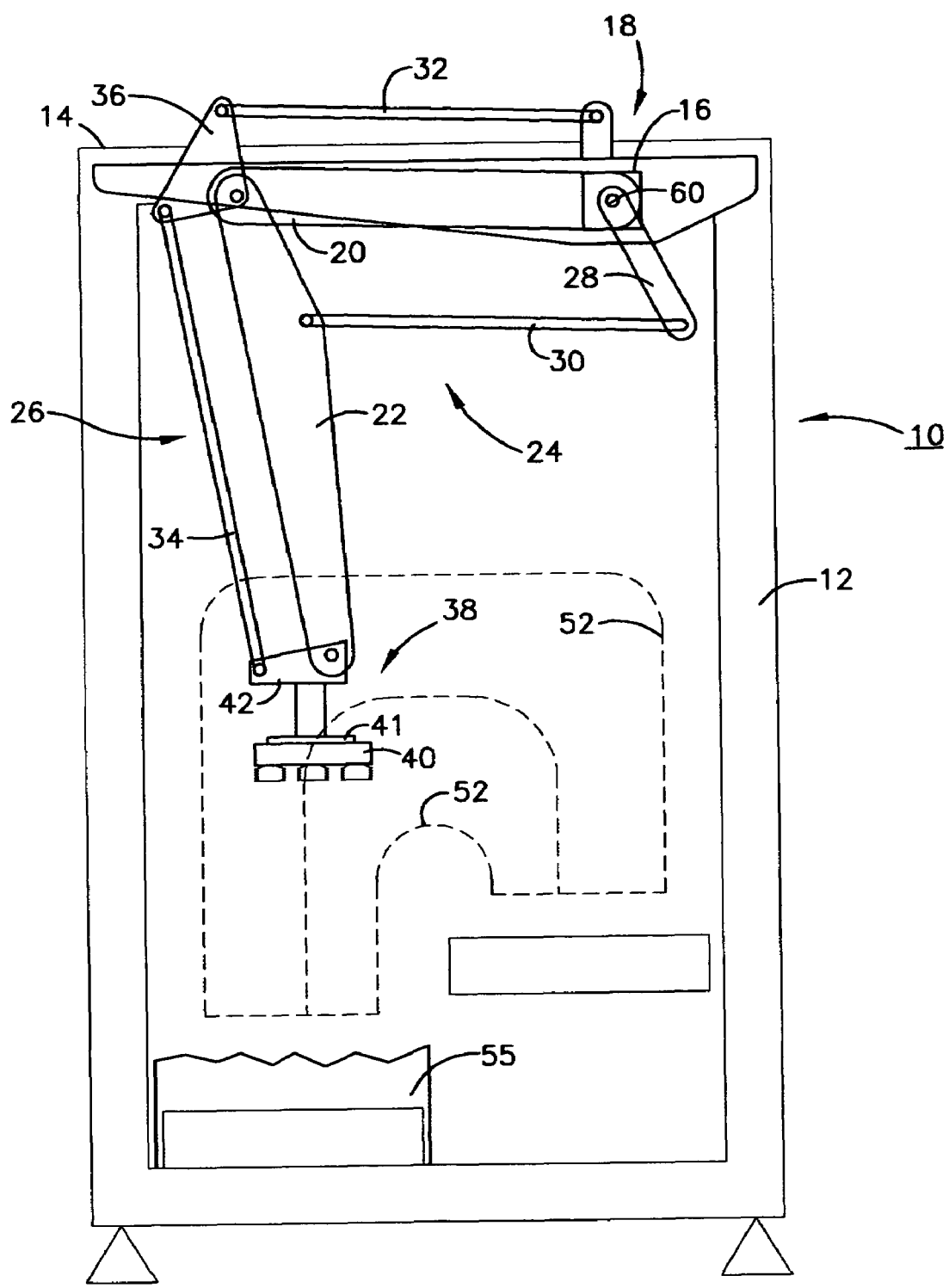

In all of FIGS. 1-8 the dotted lines 52 depict the paths of movement of end effector 40 as it moves from a stored position in FIG. 1 through a pick-up operation in FIG. 2, a lift and horizontal movement in FIGS. 3-5 and finally to a deposit position in FIG. 6 and retraction in FIG. 7.

FIG. 9 depicts a top plan view of the of the robot 10 depicted in FIGS. 1-7.

As will be further apparent to the skilled artisan, operation/control of articulated robot 10 can be achieved using a wide variety of control systems. It is preferred for the reasons of ease of programming, repair etc. discussed above, that a PLC controller of the type conventionally utilized to control a gantry robot be used to program and control robot 10 of the present invention.

There has thus been described a case packing robot comprising a two dimensional articulated robot suspended from the top of a Cartesian gantry-type frame enclosure. All drive motors are fixed to the Cartesian gantry-type frame enclosure and all packing operations take place within the confines of the Cartesian gantry frame structure. Such a "hybrid" robot provides all of the sanitary advantages of an articulating robot while supplying many of the operational and maintenance advantages of a Cartesian gantry robot.

The overall footprint of the hybrid robot of the present invention has thus been optimized for a case packing application with almost 100% useable space within the footprint. Because the arm is mounted overtop of its work area and can reach to both extremities of its footprint there is no wasted space. The width of the machine is preferably designed to be as long as a large standard box which is packed. The length of the machine is preferably designed to be twice as wide as a large standard box so product can be collated into a full layer and then loaded into the box. A wide end effector may extend the full width of the footprint and the path of the arm will allow the end effector to reach the full length of the footprint.

The traditional articulated robot of the prior art is mounted to the floor and reaches from one conveyor to another. In this configuration it is difficult for the arm to reach down inside a tall box in order to place the first layer of product. The present invention is configured such that the first arm (arm 20 in the accompanying Figures) is generally horizontal and primarily produces up and down motion and the second arm (arm 22 in the accompanying Figures) is generally vertical when the end effector is over the box. This configuration allows the present invention to reach deep down inside a box 55 being loaded.

Robot 10 preferably incorporates sanitary design principles throughout its components. The standard configuration of an articulated arm would have horizontal surfaces, mated surfaces, enclosed components, and areas which are not easily accessible or cleanable. The present invention is designed for full washdown applications. All surfaces are angled so liquid deposits drain, there are no horizontal mated components, all of the components used are easily accessible and cleanable. Additionally, the design allows for all stainless steel and washdown duty components.

Robot 10 of present invention incorporates a balanced design with minimal offset forces. A typical configuration would offset the linkages from each other because the offset connections allow a more complete range of motion. The offset connections must be very robust because they will be subjected to the offset forces. For this reason, the typical configuration would be slow but have a wide range of motion. The present invention has all linkages and pivot points balance and centered on a plane directly through the center of the arm. This arrangement allows for light weigh components because they are only subjected to radial loads—no side loads. The resulting degree of motion is limited but is fully unrestrained within the work envelope necessary for a case packing application. The reason the standard configuration would be used is to allow the arm to be used for universal tasks such as painting and welding. The present invention is optimized for the case packing work envelop. The resulting lighter weight components all the present invention to move at much higher speeds than a traditional arm.

As the invention has been described, it will be apparent to those skilled in the art that the same may be varied in many ways without departing from the spirit and scope of the invention. Any and all such modifications are intended to be included within the scope of the appended claims.

What is claimed is:

1. A case packing robot comprising:
   a. a frame having a top, a bottom and vertical sides all defining an operating envelope;
   b. two servo motors mounted to said top;
   c. a two dimensional articulated robot suspended from said top inside of said operating envelope comprising:
      i. a first arm having a first end proximate one of said servo motors and a remote end;
      ii. a second arm having a first end proximate said remote end of said first arm and a second end remote from said remote end of said first arm;
      iii. first and second first arm tie rods; and
      iv. first and second arm tie rods; and
      v. an end effector;
   said first and second first arm tie rods connected to one of said servo motors so as to impart vertical movement of said first arm, and said first and second second arm tie rods connected to the other of said servo motors so as to impart horizontal movement of said second arm and product and said end effector attached to said remote end of said second arm.

2. The case packing robot of claim 1 wherein said second arm is offset.

3. The case packing robot of claim 2 further including utility lines within the space provided by said second arm offset.

4. The case packing robot of claim 1 wherein both of said servo motors are co-axial.

5. The case packing robot of claim 1 wherein said servo motors as both located on the same side of said first arm in staggered relationship.

6. A case packing robot comprising:
   A) a frame having a top, a bottom and vertical sides all defining an operating envelope;
   D) first and second servo motors mounted to said top; and
   E) a two dimensional articulated robot suspended from said top inside of said operating envelope attached to and driven by said servo motors and including:
      I) a generally horizontal first arm proximate said top having a first arm first end and first arm second end, driven by said first servo motor and attached to said first servo motor at said first arm first end;
      II) a generally vertical second arm having a second arm first end attached to said first arm second end and a distal end, driven by said second servo motor imparting vertical movement; and
      III) an end effector attached to said second arm distal end;
   wherein said first arm imparts vertical movement to said end effector, said second arm imparts horizontal movement to said end effector and said second arm is offset.

7. The case packing robot of claim 6 further including utility lines within the space provided by said second arm offset.

8. The case packing robot of claim 6 wherein both of said servo motors are co-axial.

9. The case packing robot of claim 6 wherein said servo motors as both located on the same side of said first arm in staggered relationship.

* * * * *